United States Patent
Marland (10) Patent No.: US 7,345,864 B2
(45) Date of Patent: Mar. 18, 2008

(54) VOLTAGE LIMITER FOR COAXIAL CABLE CARRYING RF SIGNALS AND VOLTAGE

(75) Inventor: Dale W. Marland, Erieville, NY (US)

(73) Assignee: Eagle Comtronics, Inc., Liverpool, NY (US)

( * ) Notice: Subject to any disclaimer, the term of this patent is extended or adjusted under 35 U.S.C. 154(b) by 241 days.

(21) Appl. No.: 10/918,492

(22) Filed: Aug. 13, 2004

(65) Prior Publication Data

US 2005/0047051 A1   Mar. 3, 2005

Related U.S. Application Data

(60) Provisional application No. 60/497,871, filed on Aug. 26, 2003.

(51) Int. Cl.
*H02H 9/06* (2006.01)
(52) U.S. Cl. ..................................... 361/119
(58) Field of Classification Search ................ 361/119, 361/91.6
See application file for complete search history.

(56) References Cited

U.S. PATENT DOCUMENTS 3,248,569 A * 4/1966 Weekes ..................... 327/323
4,878,245 A * 10/1989 Bradley et al. ............. 725/104
5,124,873 A * 6/1992 Wheeler et al. ............. 361/58
5,793,590 A * 8/1998 Vokey et al. ................ 361/79
6,697,239 B2 * 2/2004 Pixley et al. ................ 361/42
7,054,127 B1 * 5/2006 Scearce et al. ............. 361/119
2002/0158609 A1 * 10/2002 Lavington et al. .......... 320/165
2005/0259376 A1 * 11/2005 Bishop ....................... 361/120

OTHER PUBLICATIONS

U.S. Appl. No. 11/321,687, filed Dec. 29, 2005, Marland.

* cited by examiner

*Primary Examiner*—Michael Sherry
*Assistant Examiner*—Lucy Thomas
(74) *Attorney, Agent, or Firm*—Burr & Brown (57) ABSTRACT

A voltage limiter for a coaxial cable line that carries an RF signal and an AC powering voltage signal is provided, including a signal input carrying a first AC voltage signal and an RF signal, a signal output arranged in series with the input and carrying the RF signal and a second AC voltage signal that is lower than the first AC voltage signal, and a voltage limiting mechanism arranged between the input and the output. The voltage limiting mechanism reduces the first AC voltage signal to the second AC voltage signal without substantially affecting the integrity of the RF signal.

75 Claims, 4 Drawing Sheets

VOLTAGE LIMITER FOR COAXIAL CABLE CARRYING RF SIGNALS AND VOLTAGE

CROSS-REFERENCE TO RELATED APPLICATION

This application is a non-provisional of U.S. application Ser. No. 60/497,871, filed Aug. 26, 2003, the entirety of which is incorporated herein by reference.

FIELD OF THE INVENTION

The present invention relates to a voltage limiter for a coaxial cable that carries RF signals and voltage, and in particular relates to a voltage limiter that reduces the amplitude of the voltage carried on a drop cable extending from a main line distribution cable to a lower level that can be safely carried by the drop cable to a subscriber residence.

BACKGROUND OF THE INVENTION

CATV distribution systems typically include active devices and passive devices that are physically connected via main line distribution cables that have a metallic center conductor provided within a metallic sheath and surrounded by an insulator. Examples of the active devices typically included in a main line distribution cable of a CATV distribution system include amplifiers, line extenders, and status monitoring equipment. Examples of passive devices included in a CATV distribution system include directional taps that feed the television signal (RF signal) carried on the main line distribution cable to a drop cable that carries the signal to individual subscriber residences.

In the past, the only devices that required power were those coupled to the main line distribution cables of the distribution network, such as the active devices described above. Those devices were typically powered with a 60 volt RMS, 60 Hertz signal that was carried on the main line distribution cable along with the other television (RF) signals. The power supply units that provide this 60 volt RMS, 60 Hertz signal waveform to the main line distribution cable are generally backed up by internal batteries that allow the distribution system to continue to operate in the event of a power failure.

It is becoming more common to provide an active device at the end of the drop cable, e.g., attached to an exterior portion of a subscriber residence, to provide an alternative access to local and long distance telephone service that would normally be supplied by a local telephone service system operator. In order for the CATV operator to supply a service that is similar to that of the incumbent telephone service, it is desired to power the active device, also known as a Network Interface Unit (NIU), located in or on each subscriber's residence with the same voltage sources that are used to power the main line distribution system. This will allow the NIU to continue to operate even in the event of a power failure.

The voltage supplied to the main line distribution cable is subject to a series of voltage drops associated with each active and passive device carried by the main line distribution cable, and by the series resistance of the main line cable itself, connected between the active and passive devices, which ultimately limits the number of devices that can be powered effectively from a single power supply unit. Since each active device within the distribution system consumes a certain amount of power, the voltage available for subsequent active devices drops due to the voltage drop associated with each successive active device. Consequently, auxiliary power supply units need to be positioned at predetermined intervals along the main line distribution cables to provide sufficient voltage for successive downstream active devices.

In view of the extra loading that this additional powering requirement imposes on the overall distribution network, the designers of the powering components and active distribution equipment have elected to increase the voltage carried on the main line distribution cable to compensate for the increased power requirements. In many cases the providers for CATV systems elected to increase the voltage level carried on the main line distribution cables from 60 volts RMS to 90 volts RMS. Increasing the voltage increases the amount of operational current along the line, which allows the number and frequency of auxiliary power supply units to be reduced. The decision to increase the voltage to 90 volts RMS was also driven by the desire to reduce the number and/or frequency of auxiliary power supply units provided intermittently along the main line distribution cables.

This new voltage level, however, exceeds the limits for drop cables set by the National Electric Code (NEC) and the energy limitations stated in Section 820-4 of Community Antenna Television and Radio Distribution Systems, Article 820. Accordingly, cable operators providing a 90 volt RMS power signal are subject to the regulations imposed under Article 830 of the NEC, which sets forth the standards for cable wiring having a power level above 60 volts RMS. For example, NEC 830 requires burying cable lines carrying more than 60 volts RMS, or requires an additional safeguard device such as a voltage monitor with a power cut-off feature, to prevent injury and equipment damage in the event that the integrity of the drop cable is somehow breached. The more stringent standards of NEC 830 result in a significant increase in hardware cost.

To meet the requirements of NEC 830, many providers in the CATV industry currently employ a device called a "Drop Check" such as the device described in U.S. Pat. No. 5,793,590 to Vokey et al. The '590 patent describes a two part device used to monitor the integrity of both the center conductor and the outer conductor of the drop cable that operates in a manner similar to a GFI (Ground Fault Interrupt) device in standard residential wiring systems. If the pole mounted portion of the device, which is directly connected to the output conductor of the directional tap, does not sense the second portion of its circuit that resides at the other end of the drop cable within the NIU enclosure (at the NIU input), the 90 volt AC signal is automatically interrupted at the pole mounted device. Any interference with the drop cable line, such as a break or interruption of the structural integrity of the outer conductor, for example, will trip the circuit so that the power is cut from the drop cable at the pole. In that manner, unexpected contact with the damaged drop cable is unlikely to result in injuries such as burns, fires or electrocution, caused by contact with the current carried by the drop cable.

Since the "Drop Check" device has been implemented in the field, however, CATV providers have recognized several significant problems. For example, the structure of the device itself includes inherent power inefficiencies. Since the device only conducts over ¼ of the signal waveform, its efficiency is effectively reduced. In addition, the reliability of the device is notoriously low, as well, and a high mortality (failure) rate in the field has been reported. Still further, the devices are quite costly, and there are undesirable costs associated with implementing and maintaining the multiple component parts of the device.

In view of the foregoing, it would be desirable to provide a highly reliable, highly efficient device that can be installed in communication with main line distribution cables, preferably at the head-end of the drop cables, such that a CATV provider can power successive active units (e.g., NIUs) with the least possible number of auxiliary power supply units, and at the same time reduce the power actually fed to the drop cables so as to remain within the less burdensome requirements of NEC 820.

It would be more desirable to provide a highly reliable, highly efficient and highly cost effective voltage limiter that can be used in connection with a directional tap to limit the voltage carried on a drop cable extending from the main line distribution cable to a lower voltage so as to comply with the applicable safety regulations while ensuring that sufficient power is available on the main line distribution cables to power a higher number of downstream active devices.

SUMMARY OF THE INVENTION

It is an object of the present invention to overcome the drawbacks associated with the prior art and to address the problems described above. According to one embodiment of the present invention, a voltage limiter for a coaxial line that carries an RF signal and an AC powering voltage signal (waveform) is provided. The voltage limiter includes a signal input carrying a first AC voltage signal and an RF signal, a signal output arranged in series with the input and carrying the RF signal and a second AC voltage signal that is lower than the first AC voltage signal, and a voltage limiting mechanism arranged between the input and the output. The voltage limiting mechanism reduces the first AC voltage signal to the lower second AC voltage signal without substantially affecting the integrity of the RF signal.

According to another embodiment of the present invention, the voltage limiter further includes surge protection means arranged between the input and the output. Preferably, the surge protection means comprises a first surge protection device arranged between the input and the first capacitor and a second surge protection device arranged between the first capacitor and the output. The surge protection devices can be gas tubes or spark gaps, for example, depending upon the level of surge protection required.

According to another aspect of the present invention, the voltage limiter includes a fuse device between the voltage limiting mechanism and the output. The fuse device is preferably a self resettable fuse, such as a polycrystalline thermal fuse.

Preferably, the total voltage of the first AC voltage signal comprises an AC powering voltage waveform having a positive region and a negative region, and the voltage limiting mechanism comprises a plurality of diodes arranged to reduce the total voltage of the first AC voltage signal down to the second AC voltage signal.

According to one embodiment of the present invention, the voltage limiting mechanism includes a pair of diodes arranged in series cathode to cathode. The pair of diodes can include a first Zener diode having a predetermined avalanche voltage and a second Zener diode having a predetermined avalanche voltage, and the predetermined avalanche voltage of each of the first and the second Zener diodes can be substantially the same, for example, 30 volts, or, in some cases, 15 volts.

According to another aspect of the present invention, the voltage limiter preferably includes at least one capacitor arranged between the pair of diodes and ground. In a preferred embodiment, one capacitor is arranged between the first Zener diode and ground and another capacitor is arranged between the second Zener diode and ground.

According to another embodiment of the present invention, the plurality of diodes of the voltage limiting mechanism includes a first diode pair configured to pass the positive region of the AC powering voltage waveform of the first AC voltage signal and a second diode pair configured to pass the negative region of the AC powering voltage waveform of the first AC voltage signal. Preferably, the first diode pair includes a steering diode and a Zener diode having a predetermined avalanche voltage arranged cathode to cathode in series, and the second diode pair includes a steering diode and a Zener diode having a predetermined avalanche voltage arranged cathode to cathode in series. It is also preferred that the first diode pair is arranged in parallel to the second diode pair.

It is also preferred that the voltage limiter further includes a first capacitor arranged between the input and the output. The first capacitor preferably has a sufficiently high impedance to effectively block the first AC voltage signal while allowing the RF signal to pass without any substantial signal degradation. It is also preferred that the voltage limiter further includes an RF choke, such as an inductor, arranged between the input and the voltage limiting mechanism. Preferably, the RF choke has a sufficiently high impedance to effectively block the RF signal while allowing the first AC voltage signal to pass without any substantial signal degradation. It is also preferred that the voltage limiter further includes a second capacitor arranged between the RF choke and ground. This second capacitor preferably has a value that is selected to provide a low-pass filter for any portion of the RF signal that leaks past the RF choke, and to shunt any leaked portion of the RF signal to ground.

Preferably, the voltage limiter further includes a second RF choke arranged between the voltage limiting mechanism and the output, and it is preferred that the second RF choke has a sufficiently high impedance to effectively block the RF signal while allowing the second AC voltage signal to pass without any substantial signal degradation. Additionally, a third capacitor is also preferably provided, arranged between the second RF choke and ground. This third capacitor preferably has a value that is selected to provide a low-pass filter for any portion of the RF signal that leaks past the second RF choke, and to shunt any leaked portion of the RF signal to ground.

According to another aspect of the present invention, the voltage limiter further includes a fourth capacitor arranged between the first RF choke and ground. Preferably, the fourth capacitor is electrically common to the second capacitor and preferably comprises a different material than the second capacitor. The voltage limiter also preferably includes a fifth capacitor arranged between the second RF choke and ground. Preferably, the fifth capacitor is electrically common to the third capacitor, and preferably comprises a different material than the third capacitor.

According to another embodiment of the present invention, a voltage limiter for a coaxial cable line that carries an RF signal and an AC powering voltage signal is provided, including a signal input carrying a first AC voltage signal and an RF signal, a signal output carrying the RF signal and a second AC voltage signal that is lower than the first AC voltage signal, and a first branch connecting the input to the output. The first branch is configured to pass the RF signal while blocking transmission of the first AC voltage signal. The voltage limiter also includes a second branch arranged in parallel with the first branch, the second branch being configured to pass the first AC voltage signal while blocking transmission of the RF signal. The second branch further comprises a voltage limiting mechanism that reduces the first AC voltage signal to the lower second AC voltage signal without substantially affecting the integrity of the RF signal.

According to one embodiment, the voltage limiting mechanism includes a pair of diodes arranged cathode to cathode in series on the second branch. Preferably, the pair of diodes comprises a first Zener diode having a predetermined avalanche voltage and a second Zener diode having a predetermined avalanche voltage.

According to a preferred embodiment, the second branch comprises a first sub-branch and a second sub-branch arranged in parallel to the first sub-branch, and the plurality of diodes comprises a first diode pair arranged on the first sub-branch and a second diode pair arranged on the second sub-branch. Preferably, the first diode pair is configured to pass the positive region of the AC powering voltage waveform of the first AC voltage signal and the second diode pair is configured to pass the negative region of the AC powering voltage waveform of the first AC voltage signal.

According to another embodiment of the present invention, a voltage limiter for a coaxial cable line carrying an RF signal and an AC powering voltage signal is provided, including a signal input carrying a first AC voltage signal and an RF signal, a signal output carrying the RF signal and a second AC voltage signal, a first branch connecting the input to the output and a second branch arranged in parallel with the first branch. The first branch comprises means for passing the RF signal while blocking transmission of the first AC voltage signal, and the second branch comprises means for passing the first AC voltage signal while blocking transmission of the RF signal. The second branch further comprises voltage limiting means for reducing the first AC voltage signal to the lower second AC voltage signal without substantially affecting the integrity of the RF signal.

According to another embodiment of the present invention, a CATV distribution system device is provided, including a housing having an input port configured to communicate with a first coaxial line carrying an RF signal and a first AC voltage signal, and an output port configured to communicate with a second coaxial line carrying the RF signal and a second AC voltage signal, the second AC voltage signal being lower than the first AC voltage signal, and a voltage limiting mechanism positioned with the housing. The voltage limiting mechanism reduces the first AC voltage signal to the lower second AC voltage signal without substantially affecting the integrity of the RF signal. According to this embodiment, it is preferred that the first coaxial line comprises a CATV main line distribution cable and the second coaxial line comprises a drop cable.

The voltage limiter according to the present invention essentially removes a desired amount of voltage, such as 30 volts, for example, from the 90 volt AC powering voltage signal that CATV providers have elected to carry on main line distribution cables. This, in turn, provides a reduced (e.g., 60 volt) maximum amplitude of the AC powering voltage signal at the output of the device. The reduced voltage signal is then carried on a drop cable that communicates with an active device for a particular subscriber or small group of subscribers.

In preferred embodiments of the invention, Zener diodes are used to limit the voltage exiting the device. As it is commonly known in the art, a Zener diode rejects any current flow until a certain voltage potential is achieved. This voltage potential is known as the avalanche breakdown, avalanche voltage, or Zener voltage of the Zener diode. By selecting Zener diodes having a 30 volt Zener voltage, for example, a 90 volt waveform will be reduced to 60 volts in the present invention.

The voltage limiter according to the present invention solves all the problems associated with the prior art devices described above. First, rather than relying upon a complex current interrupt-type system, the present invention transforms the 90 volt AC powering voltage signal into a 60 volt AC powering voltage signal, which allows the CATV provider to operate under the regulations of NEC 820, rather than the more burdensome requirements of NEC 830.

The voltage limiter according to the present invention is also much more reliable in the field, in that it can be provided within a single, sealed housing, such as an Eagle Comtronics EM or 10M sized tubular package. Being a one-piece unit, the voltage limiter is also easy to install, in that it can be attached directly to the output port of a directional tap connected to a main line distribution cable.

The voltage limiter of the present invention is highly efficient, even in view of the fact that there is an intrinsic amount of loss associated with the resistances of the components and heating considerations as the power wattage is consumed at the active device (e.g., NIU). That is, even at a power level of 5 W, testing has shown more than 90% performance efficiency for current consumption.

The present invention thus provides a highly reliable, highly efficient, relatively low cost solution to the above-described problems with the prior art drop line monitoring systems, while enabling the main line distribution cable to carry a higher voltage. The number of auxiliary power supply units that need to be added to the main line cable to boost the power can thus be reduced, and service subscribers can have access to a less expensive telephone service that operates at a "five 9s" (e.g., 99.999%) level of reliability, which is comparable to the standards boasted by the higher-priced local telephone service providers.

BRIEF DESCRIPTION OF THE DRAWINGS

For a better understanding of the nature and objects of the present invention, reference should be made to the following detailed description of a preferred mode of practicing the invention, read in connection with the accompanying drawings, in which.

DETAILED DESCRIPTION OF THE INVENTION

The voltage limiter of the present invention operates in connection with the particular waveform characteristics of the 60 Hz AC signal provided by the CATV power supply. That is, the typical CATV power supply includes a Ferroresonate circuit having an output that is substantially a square wave (e.g., quasi-square wave) or a sharp transient trapezoidal wave. These types of waveforms offer a higher level of efficiency when compared with the standard sine wave AC signal typically associated with household electrical outlets. Further, the quasi-square or sharp transient trapezoidal waveforms still provide an alternating current that discourages galvanic reactions (interactions) between dissimilar metals found within the distribution line.

As it is commonly known in the art, the flat tops (as apposed to sharp or rounded peaks) of the quasi-square and trapezoidal AC waveform types provide a longer conduction period (phase) for rectifier circuits within the power supply systems for the active device equipment attached to the distribution line. Power passing directional taps separate the AC powering voltage signal from the RF television signals and pass the power signal through a current limiting, re-settable fuse. The AC powering voltage signal is then recombined with the RF signals at the output ports of the directional tap.

Figure 1:
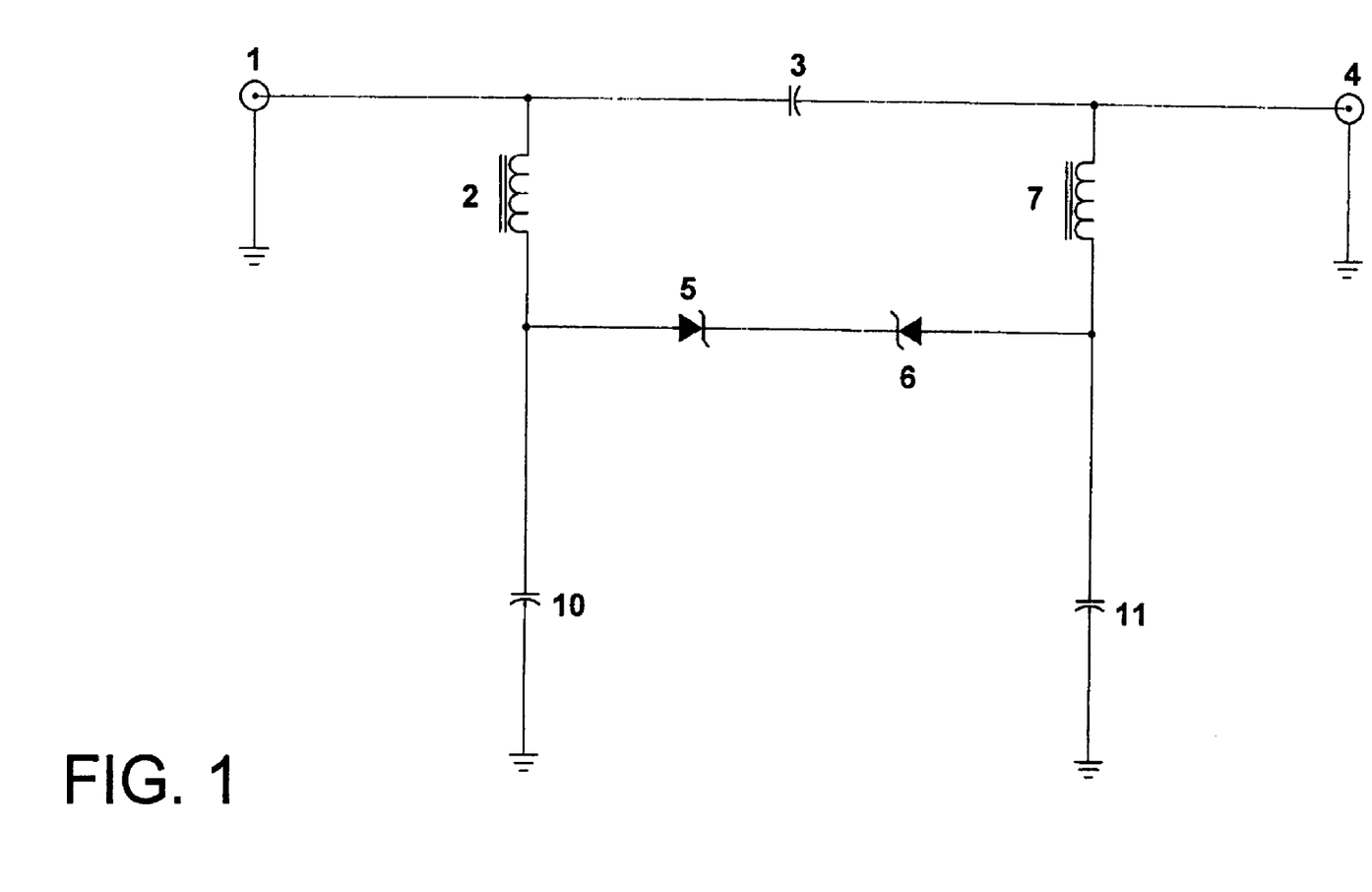
FIG. 1 is a schematic diagram showing a voltage limiter circuit according to one embodiment of the present invention.
Figure 2:
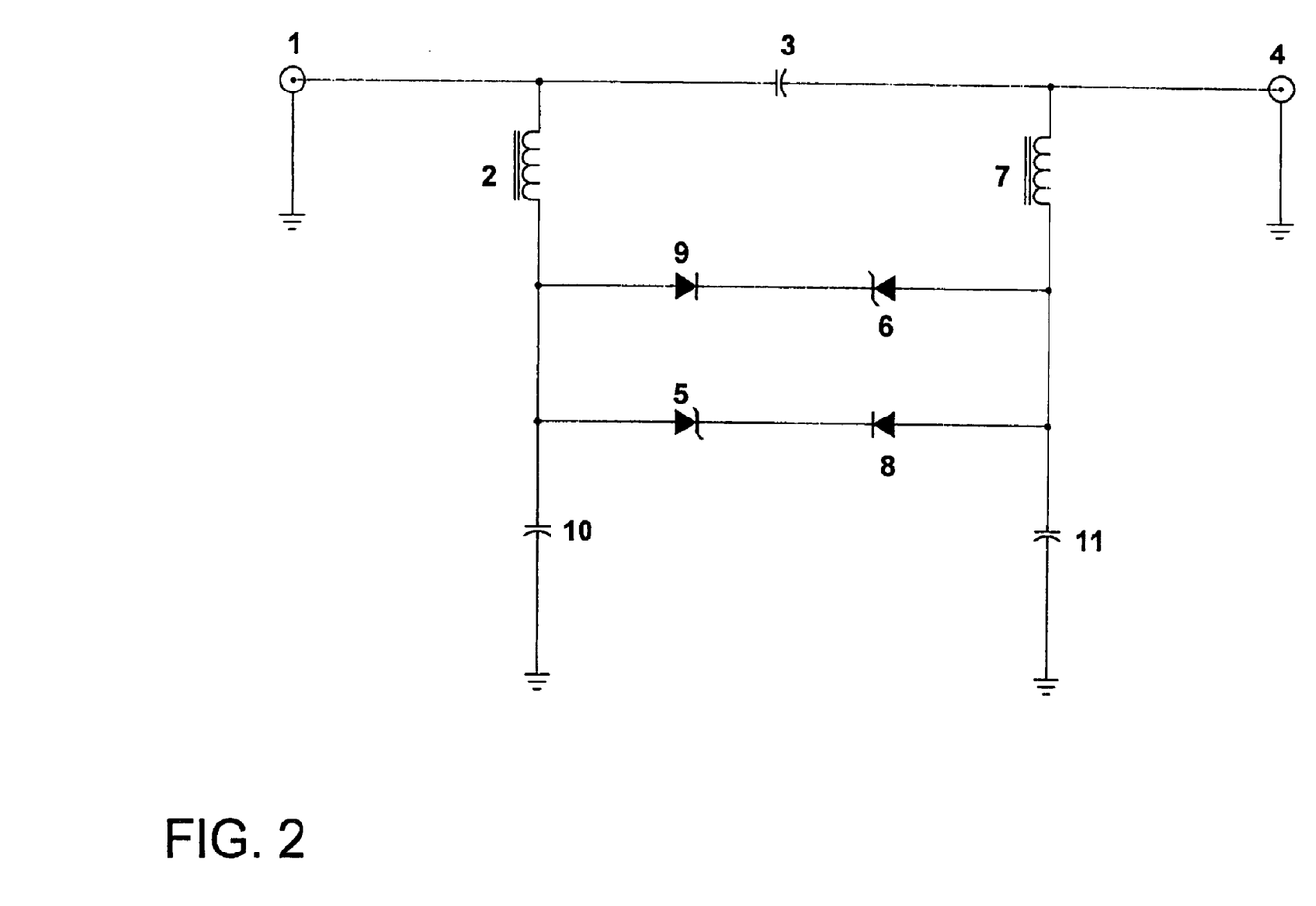
FIG. 2 is a schematic diagram showing a voltage limiter circuit according to another embodiment of the present invention.

As shown in both FIGS. 1 and 2, the AC powering voltage signal and RF signals from a CATV directional tap output, for example, are introduced into the voltage limiter of the present invention at an input 1, which can be a stinger input, for example, of a sealed CATV filter-type housing. The AC powering voltage signal and RF signals are separated by a first RF choke 2 and a capacitor 3, both positioned downstream from input 1. The AC powering voltage signal and RF signals are separated because the value of capacitor 3 (e.g., 0.0047 microFarad) is chosen so as to be a significantly high enough impedance at 60 Hz to effectively block the AC powering voltage signal while allowing the RF signal to pass with little or no degradation. The value of RF choke 2 (e.g., 4.7 microHenry) is chosen so as to be a significantly high enough impedance at RF frequencies to effectively block the RF signal while allowing the 60 Hz AC powering voltage signal to pass with little or no degradation. Any suitable device could be used to form the RF choke (e.g., an inductor coil wound around a magnetic core).

The capacitor 3 is part of a first branch of the overall circuit, and the first branch passes from input 1 to an output 4. As such, the capacitor 3 is virtually transparent to the RF signal, such that the RF signal can pass therethrough without any significant signal interruption or quality disturbance. The first RF choke 2 is part of a second, parallel branch of the overall circuit through which the AC powering voltage signal passes from input 1 to output 4. The first and second branches are re-joined upstream of output 4, to allow the RF signals and AC powering voltage signal to recombine before exiting the device.

After the AC powering voltage signal is separated from the RF signals, it is passed through a voltage limiting mechanism to lower the amplitude of the voltage that exits the device. The Zener diodes 5 and 6 shown in FIGS. 1 and 2 achieve this objective. While the same two Zener diodes 5 and 6 are included in the separate embodiments of FIG. 1 and FIG. 2, the embodiment shown in FIG. 1 differs from the embodiment shown in FIG. 2, as will be explained below.

In the arrangement shown in FIG. 1, the two Zener diodes 5 and 6 are arranged cathode to cathode in series with one another along the second branch of the circuit. In this arrangement, both Zener diodes 5 and 6 are in conduction mode most of the time, either in normal forward bias mode or in reverse mode after the avalanche potential has been exceeded.

That is, electrical conductivity in a forward bias mode flows through the Zener from anode to cathode. Thus, as shown in FIG. 1, Zener diode 5 always conducts in a forward bias mode (e.g., like a normal diode), but will not conduct in the reverse direction until the avalanche voltage of the diode has been exceeded. Because of the cathode to cathode arrangement of the Zener diodes, however, Zener diode 6 will not pass the AC powering signal in the same direction as Zener diode 5 until after the AC powering voltage signal surpasses the avalanche potential of the Zener diode 6, that is, after the predetermined (e.g., 30 volts) avalanche voltage is exceeded.

Given the alternating directional nature of the waveform of the AC powering voltage signal, it is necessary to provide two Zener diodes, arranged cathode to cathode as shown, to compensate for both the positive and negative regions of the AC powering voltage signal waveform. Since each Zener diode must exceed an avalanche voltage in either the positive region of the AC signal (Zener diode 6) or the negative region of the AC signal (Zener diode 5) before the entire AC powering voltage signal can be passed through the second branch of the circuit, the value of that avalanche voltage is effectively consumed by the operation of these Zener diodes. Consequently, the total voltage of the resultant AC powering voltage signal is reduced by the amount of the avalanche voltage in both the positive and negative regions.

For example, if it is assumed that the input AC powering voltage signal is 90 volts RMS and the desired output AC powering voltage signal is 60 volts RMS, the Zener diodes 5 and 6 could be selected to have a 30 volt avalanche voltage. If the drop line is located a distance from the power supply, however, the actual AC powering voltage signal may be something less than 90 volts RMS, for example, 75 volts RMS due to the aforementioned voltage drops. In this case, when the desired output AC voltage remains 60 volts, the Zener diodes 5 and 6 could be selected to have a 15 volt avalanche voltage. It should be apparent to those skilled in the art that the avalanche voltage of the Zener diodes is not limited to the specific examples above, and the avalanche voltage of the Zener diodes can be selected to be any value depending upon the particular AC voltage at the drop line and the difference between the input voltage and the desired output voltage.

After 30 volts is stripped from the AC powering voltage signal, it is passed through second RF choke 7 and then recombined with the RF signal passing along the first branch of the circuit. The second RF choke 7 is necessary to prevent the RF signals passing along the first branch of the circuit from entering the second branch of the circuit in the same manner that RF choke 2 effectively prohibits the RF signal from entering the first branch of the circuit. The value of the second RF choke 7 is preferably the same as that of RF choke 2 for the reasons described above.

Since the Zener diodes shown in FIG. 1 are in conduction mode most of the time, heat will be generated when the system is operating at a relatively high power level, such as the 5 Watt level required to power residential NIU devices. If this excess heat is not effectively dissipated, there is a possibility that the performance capacity of the device can be exceeded and failure can occur.

Implementing steering diodes, such as diodes 8 and 9 shown in FIG. 2, for example, reduces the power dissipation requirements of the Zener diodes 5 and 6, and improves the performance of the device of the present invention. FIG. 2 shows a preferred embodiment of the present invention, wherein two Zener diodes 5 and 6 are arranged in sub-branches parallel with one another, and wherein each Zener diode 5 and 6 is further arranged in series, cathode to cathode, with a respective steering diode 8 and 9.

The steering diodes 8 and 9 of FIG. 2 essentially allow only one polarity, either a positive region or a negative region, of the AC powering voltage signal to pass to a respective one of the Zener diodes 5 and 6. In this manner, the AC powering voltage signal is effectively steered down the two sub-branches such that the positive region of the AC signal waveform is reduced by the Zener diode on one sub-branch and the negative region of the waveform is reduced by the Zener diode on the other sub-branch. Based on the configuration of the diodes shown in FIG. 2, Zener diode 6 will pass the positive waveform region of the AC powering voltage signal only after its avalanche voltage is reached. Similarly, Zener diode 5 will pass the negative waveform region of the AC powering voltage signal only after its avalanche voltage is reached. The voltage potential of the AC powering voltage signal that is recombined with the RF signal after passing through the second RF choke 7 is reduced in both regions by the voltage amount that is consumed by each of the Zener diodes as the avalanche voltage is reached.

Since, as described above, the Zener diodes reject reverse current flow until the avalanche voltage is achieved, by selecting a Zener diode with a 30 volt avalanche voltage, for example, a 90 volt AC powering voltage signal carried at input 1 will be reduced to 60 volts AC by the Zener diodes according to the present invention. The second RF choke 7 then essentially recombines the reduced 60 volt AC powering voltage signal and the RF signals back together upon the single conductor of output 4, which then feeds the drop cable.

The capacitors 10 and 11 shown in FIGS. 1 and 2 form low pass filters that prevent any self resonant effects of the RF chokes 2 and 7 from being transmitted to the RF signal throughpath along the first branch upon recombination with the voltage downstream from the second RF choke 7. That is, while the RF chokes 2 and 7 substantially prevent the RF signals from passing, the possibility remains that lower frequency RF signals, such as frequencies less than 5 MHz, for example, might leak past the RF chokes and later recombine with the main portion of the RF signal. This can be problematic when the leaked portion of the RF signal is recombined with the main portion of the RF signal in an out-of-phase state. This type of disturbance ultimately affects the overall integrity of the RF signal, degrades the signal quality, and reduces the efficiency. Thus, capacitors 10 and 11 are provided to shunt to ground any stray portions of the RF signals that manage to leak through the RF chokes, and thus preserve the signal integrity and quality of the RF signal passing through the device of the present invention to ensure a seamless RF transmission. The capacitors 10 and 11 each have a capacitance value of about 0.001 microFarads, for example, and are therefore a high impedance to the AC powering signal.

Implementing physically larger Zener diodes also improves the power dissipation ability of the Zener diodes 5 and 6, and improves the performance of the device of the present invention. In this case, the sealed housing is required to be larger, for example, an Eagle 10M tubular package would be required instead of a smaller EM sized package. The increased package size also accommodates additional circuitry, such as surge protection devices, self resettable fuses, and additional capacitors. An example embodiment of a voltage limiter circuit according to this embodiment of the present invention is schematically shown in FIG. 3.

Figure 3:
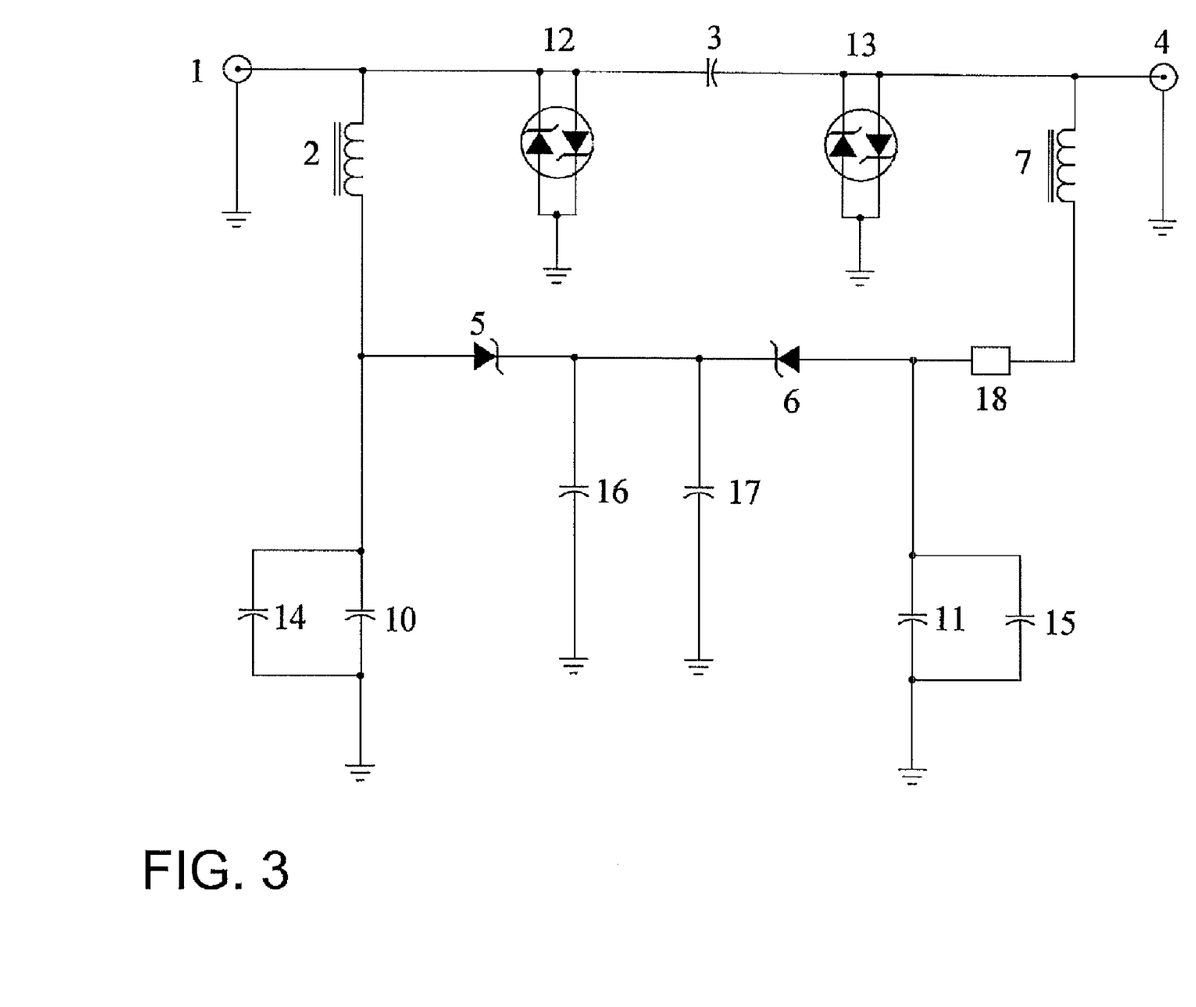
FIG. 3 is a schematic diagram showing a voltage limiter circuit according to yet another embodiment of the present invention.

The voltage limiter shown in FIG. 3 effectively performs the same function as those described above in connection with FIGS. 1 and 2, and like components have been designated with like reference numerals. In addition, however, the voltage limiter according to the example embodiment shown in FIG. 3 differs from the voltage limiters of FIGS. 1 and 2 in the following ways.

The AC powering voltage signal and RF signals are separated by a first RF choke 2 and a capacitor 3, both positioned downstream from input 1. The AC powering voltage signal and RF signals are separated because the value of capacitor 3 (e.g., 0.01 microFarad) is chosen so as to be a significantly high enough impedance at 60 Hz to effectively block the AC powering voltage signal while allowing the RF signal to pass with little or no degradation. The value of RF choke 2 (e.g., 10 microHenry) is chosen so as to be a significantly high enough impedance at RF frequencies to effectively block the RF signal while allowing the 60 Hz AC powering signal to pass with little or no degradation.

A first surge protection device 12 is provided downstream from input 1 and upstream from the capacitor 3 on the first branch of the overall circuit, which passes from input 1 to an output 4, as described above in connection with FIGS. 1 and 2. The first surge protection device 12 is also connected to ground as shown. In addition, a second surge protection device 13 is provided downstream from the capacitor 3 and upstream of the output 4 on the first branch of the overall circuit, and is also connected to ground, as shown. In that manner, with a pair of surge protection devices 12 and 13 connected to the RF (first) branch of the circuit and to ground on either side of the capacitor 3, the voltage limiter can effectively survive power surge waveforms impressed to either input 1 or output 4.

Any suitable surge protection device can be implemented, and should be selected based upon the appropriate SCTE standards and desired performance specifications. For example, as shown in the embodiment of FIG. 3, surge protection devices 12 and 13 can be gas tube surge protectors which can suppress up to a 6 kV, 3 kA combination wave surge. This is appropriate for KS port, hard-line style connectors, for example. The surge protection devices 12 and 13 could also be spark gap devices provided in a similar configuration with respect to the voltage limiting circuitry. Spark gap surge protectors typically have the ability to suppress up to 5 kV, 100 A ring wave surges at 100 kHz, which is appropriate for F style connectors, for example.

As described above, after the AC powering voltage signal is separated from the RF signals, it is passed through a voltage limiting mechanism to lower the amplitude of the AC powering voltage signal that exits the device using the Zener diodes 5 and 6. In the arrangement shown in FIG. 3, the two Zener diodes 5 and 6 are arranged cathode to cathode in series with one another along the second branch of the circuit, as described above in connection with FIG. 1.

After the desired voltage value, for example, 30 volts, is stripped from the AC powering voltage signal, it is passed through second RF choke 7 and then recombined with the RF signal passing along the first branch of the circuit. The value of the second RF choke 7 is preferably the same as that of RF choke 2 (e.g. 10 microHenry), for the reasons described above.

The capacitors 10 and 11 shown in FIGS. 1 and 2 form low pass filters that prevent any self resonant effects of the RF chokes 2 and 7 from being transmitted to the RF signal throughpath along the first branch upon recombination with the voltage downstream from the second RF choke 7, as described above. That is, capacitors 10 and 11 are provided to shunt to ground any stray portions of the RF signals that manage to leak through the RF chokes, and thus preserve the signal integrity and quality of the RF signal passing through the device of the present invention to ensure a seamless RF transmission. The capacitors 10 and 11 each have a capacitance value of about 0.001 microFarads, for example, and offer a high impedance to the AC powering voltage signal. Capacitors 10 and 11 are preferably a disc ceramic, for example.

Another set of capacitors 14 and 15 are also provided to be electrically common, but not necessarily physically common, with capacitors 10 and 11, respectively. In fact, according to a preferred embodiment, the capacitors 14 and 15 are physically located at opposite ends of a signal trace from capacitors 10 and 11. The capacitors 14 and 15 are provided for additional filtering and to further ensure that the desired output response is flat. Preferably, the value of the capacitors 14 and 15 differs from that of capacitors 10 and 11 to limit self resonance behavior. For example, capacitors 14 and 15 can have a value of 0.01 microFarad. Further, capacitors 14 and 15 are preferably physically different devices than capacitors 10 and 11. For example, capacitors 14 and 15 can be polypropylene devices rather than ceramic discs.

In addition, as mentioned above, the size of the Zener diodes 5 and 6 are increased in this embodiment, to better handle the increased power dissipation requirement as previously discussed. Accordingly, the size of the copper trace carrying signals between the diodes is also increased correspondingly to further assist in the power dissipation. In order to compensate for signal behavior variations caused by the increased size of the copper trace, yet another set of capacitors 16 and 17 is provided between the Zener diodes 5 and 6 to shunt to ground any stray RF energy that is coupled from the RF throughpath (first branch) onto the second branch, which would otherwise cause undesirable RF throughpath perturbations. That is, the capacitors 16 and 17 filter any coupled RF energy to ground before that RF energy can recombine with the signal on the RF throughpath. The values of the capacitors 16 and 17 can be, for example, 0.001 microFarad.

The voltage limiter shown in FIG. 3 also includes a self resettable fuse 18 between the output of the second branch of the circuit (i.e., the voltage limiter mechanism) and the RF choke 7 to prevent Zener diode failure if, for example, the voltage limiter is installed on a drop cable having a "hot" source. For example, providing the fuse 18 as shown in FIG. 3 reduces the risk of damaging the Zener diodes 5 and 6 if the output of the voltage limiter were accidentally shorted during installation, for example. The fuse 18 is preferably a polycrystalline thermal fuse, for example, that will significantly increase the resistance when a high current load is applied and then return to a nominal state once the high current load is removed.

It should be apparent to those skilled in the art that the actual operational values of the electronic components comprising the present invention, such as the capacitance values for the capacitors 3, 10, 11 and 14-17, the inductance values for RF chokes 2 and 7, and the avalanche values for the Zener diodes 5 and 6, can be selected according to the particular characteristics and values of the RF signals and voltage waveforms being passed through the device. The values shown herein are used merely for illustrative purposes, and the present invention is in no way limited to the specific examples described herein.

Figure 4:
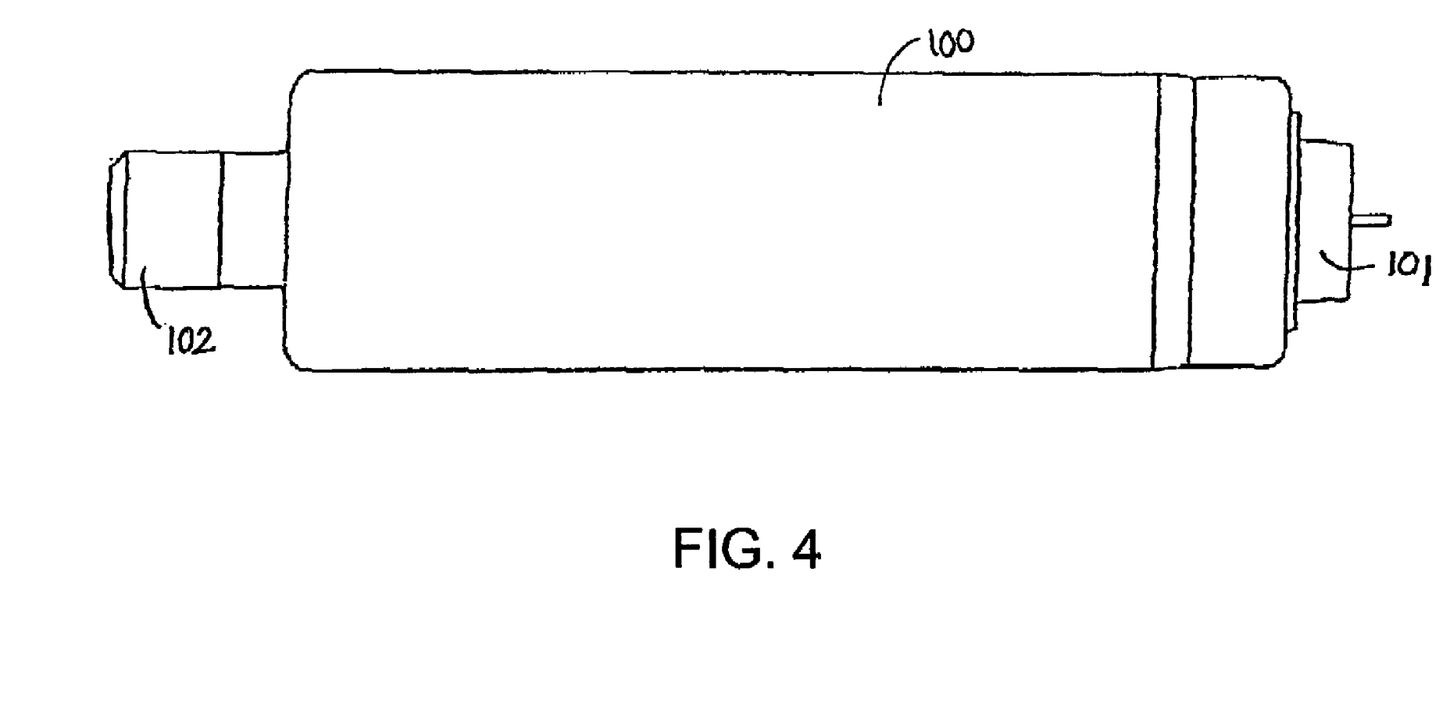
FIG. 4 is a schematic view showing the outer surface of a CATV distribution system device housing in which a voltage limiter according to the present invention is provided.

According to another embodiment of the present invention shown in FIG. 4, a CATV distribution system device is provided, including a housing 100 having an input port 101 configured to communicate with a first coaxial line carrying an RF signal and a first AC voltage signal, and an output port 102 configured to communicate with a second coaxial line carrying the RF signal and a second AC voltage signal. A voltage limiting mechanism according to any of the above-described embodiments of the present invention is positioned within the housing. It should be noted that, for some embodiments of the present invention, such as those shown in FIGS. 1 and 2, for example, the Eagle 10M type housing 100 shown in FIG. 4 could be substituted with the Eagle EM type housings described in U.S. Pat. No. 5,662,494, assigned to Eagle Comtronics, Inc., the entirety of which is incorporated herein by reference.

While the present invention has been particularly shown and described with reference to the preferred mode as illustrated in the drawings, it will be understood by one skilled in the art that various changes in detail may be effected therein without departing from the spirit and scope of the invention as defined by the claims.

I claim:

1. A voltage limiter for a coaxial line that carries an RF signal and an AC powering voltage signal, said voltage limiter comprising:
    a signal input carrying a first AC voltage signal and an RF signal;
    a signal output arranged in series with said input and carrying said RF signal and a second AC voltage signal that is lower than said first AC voltage signal; and
    a voltage limiting mechanism arranged between said input and said output, wherein said voltage limiting mechanism reduces said first AC voltage signal by an amount of 15-30 volts AC to said second AC voltage signal without substantially affecting the integrity of said RF signal.

2. The voltage limiter of claim 1, wherein the total voltage of said first AC voltage signal comprises an AC powering waveform having a positive region and a negative region, and said voltage limiting mechanism comprises a plurality of diodes arranged to reduce the total amplitude of said first AC voltage signal down to said second AC voltage signal.

3. The voltage limiter of claim 2, wherein said plurality of diodes comprises a pair of diodes arranged in series cathode to cathode.

4. The voltage limiter of claim 3, wherein said pair of diodes comprises a first Zener diode having a predetermined avalanche voltage and a second Zener diode having a predetermined avalanche voltage.

5. The voltage limiter of claim 4, wherein said predetermined avalanche voltage of each of said first and said second Zener diodes is substantially the same.

6. The voltage limiter of claim 5, wherein said predetermined avalanche voltage is 30 volts.

7. The voltage limiter of claim 5, wherein said predetermined avalanche voltage is 15 volts.

8. The voltage limiter of claim 2, wherein said plurality of diodes comprises a first diode pair configured to pass said positive region of said AC powering waveform of said first AC voltage signal and a second diode pair configured to pass said negative region of said AC powering waveform of said first AC voltage signal.

9. The voltage limiter of claim 8, wherein said first diode pair comprises a steering diode and a Zener diode having a predetermined avalanche voltage arranged in series cathode to cathode.

10. The voltage limiter of claim 8, wherein said second diode pair comprises a steering diode and a Zener diode having a predetermined avalanche voltage arranged in series cathode to cathode.

11. The voltage limiter of claim 8, wherein said first diode pair is arranged in parallel with said second diode pair.

12. The voltage limiter of claim 9, wherein said first diode pair is arranged in parallel with said second diode pair.

13. The voltage limiter of claim 10, wherein said first diode pair is arranged in parallel with said second diode pair.

14. The voltage limiter of claim 9, wherein said predetermined avalanche voltage is 30 volts.

15. The voltage limiter of claim 9, wherein said predetermined avalanche voltage is 15 volts.

16. The voltage limiter of claim 10, wherein said predetermined avalanche voltage is 30 volts.

17. The voltage limiter of claim 10, wherein said predetermined avalanche voltage is 15 volts.

18. The voltage limiter of claim 1, further comprising a first capacitor arranged between said input and said output, said first capacitor having a sufficiently high impedance to effectively block said first AC voltage signal while allowing said RF signal to pass without any substantial signal degradation.

19. The voltage limiter of claim 18, further comprising an RF choke arranged between said input and said voltage limiting mechanism, said RF choke having a sufficiently high impedance to effectively block said RF signal while allowing said first AC voltage signal to pass without any substantial signal degradation.

20. The voltage limiter of claim 19, further comprising a second capacitor arranged between said RIP choke and ground, said second capacitor having a value that is selected to provide a low-pass filter for any portion of said RF signal that leaks past said RF choke, and to shunt said leaked portion of said RF signal to ground.

21. The voltage limiter of claim 20, further comprising a second RF choke arranged between said voltage limiting mechanism and said output, said second RF choke having a sufficiently high impedance to effectively block said RF signal while allowing said second AC voltage signal to pass without any substantial signal degradation.

22. The voltage limiter of claim 21, further comprising a third capacitor arranged between said second RF choke and ground, said third capacitor having a value that is selected to provide a low-pass filter for any portion of said RF signal that leaks past said second RF choke, and to shunt said leaked portion of said RF signal to ground.

23. The voltage limiter of claim 19, wherein said RF choke comprises an inductor.

24. The voltage limiter of claim 21, wherein said second RF choke comprises an inductor.

25. The voltage limiter of claim 1, further comprising surge protection means arranged between said input and said output.

26. The voltage limiter of claim 18, further comprising surge protection means arranged between said input and said output.

27. The voltage limiter of claim 26, wherein said surge protection means comprises a first surge protection device arranged between said input and said first capacitor.

28. The voltage limiter of claim 27, wherein said surge protection means comprises a second surge protection device arranged between said first capacitor and said output.

29. The voltage limiter of claim 27, wherein said first surge protection device comprises a gas tube.

30. The voltage limiter of claim 28, wherein said second surge protection device comprises a gas tube.

31. The voltage limiter of claim 26, wherein surge protection means comprises a spark gap.

32. The voltage limiter of claim 22, further comprising a fourth capacitor arranged between said first RF choke and ground, wherein said fourth capacitor is electrically common to said second capacitor and wherein said fourth capacitor comprises a different material than said second capacitor.

33. The voltage limiter of claim 32, further comprising a fifth capacitor arranged between said second RF choke and ground, wherein said fifth capacitor is electrically common to said third capacitor, and wherein said fifth capacitor comprises a different material than said third capacitor.

34. The voltage limiter of claim 1, further comprising a fuse mechanism arranged between said voltage limiting mechanism and said output.

35. The voltage limiter of claim 34, wherein said fuse mechanism comprises a self resettable fuse device.

36. The voltage limiter of claim 3, further comprising at least one capacitor arranged between said pair of diodes and ground.

37. The voltage limiter of claim 36, wherein said at least one capacitor comprises one capacitor arranged between said first Zener diode and ground and another capacitor arranged between said second Zener diode and ground.

38. A voltage limiter for a coaxial line that carries an RF signal and an AC powering voltage signal, said voltage limiter comprising:
a signal input carrying a first AC voltage signal and an RF signal;
a signal output carrying said RF signal and a second AC voltage signal that is lower than said first AC voltage signal;
a first branch connecting said input to said output, said first branch being configured to pass said RF signal while blocking transmission of said first AC voltage signal; and
a second branch arranged in parallel with said first branch, said second branch being configured to pass said first AC voltage signal while blocking transmission of said RF signal, said second branch further comprising a voltage limiting mechanism that reduces said first AC voltage signal by an amount of 15-30 volts AC to said second AC voltage signal without substantially affecting the integrity of said RF signal.

39. The voltage limiter of claim 38, wherein the total voltage of said first AC voltage signal comprises an AC powering waveform having a positive region and a negative region, and said voltage limiting mechanism comprises a plurality of diodes arranged to reduce the total amplitude of said first AC voltage signal down to said second AC voltage signal.

40. The voltage limiter of claim 39, wherein said plurality of diodes comprises a pair of diodes arranged in series cathode to cathode on said second branch.

41. The voltage limiter of claim 40, wherein said pair of diodes comprises a first Zener diode having a predetermined avalanche voltage and a second Zener diode having a predetermined avalanche voltage.

42. The voltage limiter of claim 41, wherein said predetermined avalanche voltage of each of said first and said second Zener diodes is substantially the same.

43. The voltage limiter of claim 42, wherein said predetermined avalanche voltage is 30 volts.

44. The voltage limiter of claim 42, wherein said predetermined avalanche voltage is 15 volts.

45. The voltage limiter of claim 39, wherein said second branch comprises a first sub-branch and a second sub-branch arranged in parallel to said first sub-branch.

46. The voltage limiter of claim 45, wherein said plurality of diodes comprises a first diode pair arranged on said first sub-branch, said first diode pair being configured to pass said positive region of said AC powering waveform of said first AC voltage signal; and
a second diode pair arranged on said second sub-branch, said second diode pair being configured to pass said negative region of said AC powering waveform of said first AC voltage signal.

47. The voltage limiter of claim 46, wherein said first diode pair comprises a steering diode and a Zener diode having a predetermined avalanche voltage.

48. The voltage limiter of claim 46, wherein said second diode pair comprises a steering diode and a Zener diode having a predetermined avalanche voltage.

49. The voltage limiter of claim 47, wherein said predetermined avalanche voltage is 30 volts.

50. The voltage limiter of claim 47, wherein said predetermined avalanche voltage is 15 volts.

51. The voltage limiter of claim 48, wherein said predetermined avalanche voltage is 30 volts.

52. The voltage limiter of claim 48, wherein said predetermined avalanche voltage is 15 volts.

53. The voltage limiter of claim 38, further comprising a first capacitor arranged on said first branch between said input and said output, said first capacitor having a sufficiently high impedance to effectively block said first AC voltage signal while allowing said RF signal to pass without any substantial signal degradation.

54. The voltage limiter of claim 53, further comprising an RF choke arranged between said input and said voltage limiting mechanism on said second branch, said RF choke having a sufficiently high impedance to effectively block said RF signal while allowing said first AC voltage signal to pass without any substantial signal degradation.

55. The voltage limiter of claim 54, further comprising a second capacitor arranged on said first branch between said RF choke and ground, said second capacitor having a value that is selected to provide a low-pass filter for any portion of said RF signal that leaks past said RF choke, and to shunt said leaked portion of said RF signal to ground.

56. The voltage limiter of claim 55, further comprising second RF choke arranged on said second branch between said voltage limiting mechanism and said output, said second RF choke having a sufficiently high impedance to effectively block said RF signal while allowing said second AC voltage signal to pass without any substantial signal degradation.

57. The voltage limiter of claim 56, further comprising a third capacitor arranged between said second RF choke and ground, said third capacitor having a value that is selected to provide a low-pass filter for any portion of said RF signal that leaks past said second RF choke, and to shunt said leaked portion of said RF signal to ground.

58. The voltage limiter of claim 54, wherein said RF choke comprises an inductor.

59. The voltage limiter of claim 56, wherein said second RF choke comprises an inductor.

60. The voltage limiter of claim 38, further comprising surge protection means arranged on said first branch between said input and said output.

61. The voltage limiter of claim 53, further comprising surge protection means arranged on said first branch between said input and said output.

62. The voltage limiter of claim 61, wherein said surge protection means comprises a first surge protection device arranged on said first branch between said input and said first capacitor.

63. The voltage limiter of claim 61, wherein said surge protection means comprises a second surge protection device arranged on said first branch between said first capacitor and said output.

64. The voltage limiter of claim 62, wherein said first surge protection device comprises a gas tube.

65. The voltage limiter of claim 63, wherein said second surge protection device comprises a gas tube.

66. The voltage limiter of claim 60, wherein surge protection means comprises a spark gap.

67. The voltage limiter of claim 57, further comprising a fourth capacitor arranged between said first RF choke and ground, wherein said fourth capacitor is electrically common to said second capacitor and wherein said fourth capacitor comprises a different material than said second capacitor.

68. The voltage limiter of claim 67, further comprising a fifth capacitor arranged between said second RF choke and ground, wherein said fifth capacitor is electrically common to said third capacitor, and wherein said fifth capacitor comprises a different material than said third capacitor.

69. The voltage limiter of claim 38, further comprising a fuse mechanism arranged on said second branch between said voltage limiting mechanism and said output.

70. The voltage limiter of claim 69, wherein said fuse mechanism comprises a self resettable fuse device.

71. The voltage limiter of claim 41, further comprising at least one capacitor arranged on said second branch between said pair of diodes and ground.

72. The voltage limiter of claim 71, wherein said at least one capacitor comprises one capacitor arranged between said first Zener diode and ground and another capacitor arranged between said second Zener diode and ground.

73. A voltage limiter for a coaxial cable line carrying an RF signal and an AC powering voltage signal, said voltage limiter comprising:
a signal input carrying a first AC voltage signal and an RF signal;
a signal output carrying said RF signal and a second AC voltage signal;
a first branch connecting said input to said output, said first branch comprising means for passing said RF signal while blocking transmission of said first AC voltage signal; and
a second branch arranged in parallel with said first branch, said second branch comprising means for passing said first AC voltage signal while blocking transmission of said RF signal, said second branch further comprising voltage limiting means for reducing said first AC voltage signal by an amount of 15-30 volts AC to said second AC voltage signal without substantially affecting the integrity of said RF signal.

74. A CATV distribution system device, comprising:
a housing having an input port configured to communicate with a first coaxial line carrying an RF signal and a first AC voltage signal, and an output port configured to communicate with a second coaxial line carrying said RF signal and a second AC voltage signal, said second AC voltage signal being lower than said first AC voltage signal; and
a voltage limiting mechanism positioned with said housing to reduce said first AC voltage signal by an amount of 15-30 volts AC to said second AC voltage signal without substantially affecting the integrity of said RF signal.

75. The device of claim 74, wherein said first coaxial line comprises a CATV main line cable and said second coaxial line comprises a drop cable.

* * * * *

UNITED STATES PATENT AND TRADEMARK OFFICE
CERTIFICATE OF CORRECTION

PATENT NO. : 7,345,864 B2 Page 1 of 1
APPLICATION NO. : 10/918492
DATED : March 18, 2008
INVENTOR(S) : Dale W. Marland It is certified that error appears in the above-identified patent and that said Letters Patent is hereby corrected as shown below:

Column 13

*Line 20*: please change "RIP" to --RF--

Signed and Sealed this

Fifth Day of August, 2008

JON W. DUDAS
*Director of the United States Patent and Trademark Office*